United States Patent
Wang et al.

(10) Patent No.: US 12,532,318 B2
(45) Date of Patent: Jan. 20, 2026

(54) TRANSMISSION METHOD AND DEVICE

(71) Applicant: VIVO MOBILE COMMUNICATION CO., LTD., Dongguan (CN)

(72) Inventors: Yuanyuan Wang, Dongguan (CN); Huaming Wu, Dongguan (CN); Ye Si, Dongguan (CN); Zixun Zhuang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 638 days.

(21) Appl. No.: 17/886,431

(22) Filed: Aug. 11, 2022

(65) Prior Publication Data

US 2022/0386349 A1 Dec. 1, 2022

Related U.S. Application Data

(63) Continuation of application No. PCT/CN2021/076041, filed on Feb. 8, 2021.

(30) Foreign Application Priority Data

Feb. 14, 2020 (CN) .......................... 202010093983.3

(51) Int. Cl.
*H04W 72/02* (2009.01)
*H04L 5/00* (2006.01)
*H04W 72/21* (2023.01)

(52) U.S. Cl.
CPC ........... *H04W 72/21* (2023.01); *H04L 5/0048* (2013.01)

(58) Field of Classification Search
CPC . H04W 72/02; H04W 72/04; H04W 72/0446; H04W 72/121; H04W 72/23; H04W 72/50; H04W 72/51; H04W 72/52; H04W 72/53; H04W 72/54;
(Continued)

(56) References Cited

U.S. PATENT DOCUMENTS

| 2018/0324771 | A1 | 11/2018 | Hosseini et al. |
| 2019/0053280 | A1 | 2/2019 | Rico Alvarino et al. |
| 2020/0154449 | A1* | 5/2020 | Akkarakaran ........ H04W 72/56 |
| 2022/0174700 | A1* | 6/2022 | Go ........................ H04L 1/1864 |

(Continued)

FOREIGN PATENT DOCUMENTS

| CN | 104137465 A | 11/2014 |
| CN | 109391447 A | 2/2019 |
| CN | 109561505 A | 4/2019 |

(Continued)

OTHER PUBLICATIONS

International Search Report issued in corresponding International Application No. PCT/CN2021/076041, mailed Apr. 29, 2021, 4 pages.

(Continued)

*Primary Examiner* — Bo Hui A Zhu
(74) *Attorney, Agent, or Firm* — IPX PLLC

(57) ABSTRACT

A transmission method and a device are provided. The method includes: in a case that resources of at least two of channels or signals at least two of channels or signals conflict, transmitting a channel/signal with a high priority, and/or discarding a channel/signal with a low priority based on a priority relationship between the at least two of channels or signals, where at least one of the at least two of channels or signals is: a first SRS, where the first SRS is an SRS used for positioning.

20 Claims, 3 Drawing Sheets

(58) Field of Classification Search
CPC ............ H04W 72/541; H04W 72/542; H04W 72/543; H04W 72/56
See application file for complete search history.

(56) References Cited

FOREIGN PATENT DOCUMENTS

| CN | 110582978 A | 12/2019 |
|---|---|---|
| CN | 111465101 A | 7/2020 |
| WO | 2019022561 A1 | 1/2019 |

OTHER PUBLICATIONS

Extended European Search Report issued in related European Application No. 21753260.5, mailed May 11, 2023, 16 pages.
Ericsson, "FL summary for 7.2.10.2 UL Reference Signals for NR Positioning", 3GPP TSG RAN WG1 Meeting#99, R1-1913268, Nov. 2019, 20 pages.
Mitsubishi Electric, Views on UL reference signals designs for NR positioning, 3GPP TSG RAN WG1 Meeting#99, R1-1912837, Nov. 2019, 6 pages.
Qualcomm Inc., "Remaining Details on UL Reference Signals for NR Positioning", 3GPP TSG RAN WG1 Meeting#98, R1-1912974, Oct. 2019, 4 pages.
Ericsson, "UL Reference Signals for NR Positioning", 3GPP TSG RAN WG1 Meeting#99, R1-1913136, Nov. 2019, 12 pages.
First Office Action issued in related Chinese Application No. 202010093983.3, mailed Aug. 2, 2022, 6 pages.
Second Office Action issued in related Chinese Application No. 202010093983.3, mailed Jan. 18, 2023, 5 pages.
Decision of Rejection issued in related Chinese Application No. 202010093983.3, mailed Apr. 24, 2023, 5 pages.

* cited by examiner

TRANSMISSION METHOD AND DEVICE

CROSS-REFERENCE TO RELATED APPLICATIONS

This application is a continuation of International Application No. PCT/CN2021/076041, filed on Feb. 8, 2021, which claims priority to Chinese Patent Application No. 202010093983.3, filed on Feb. 14, 2020. The entire contents of each of the above-identified applications are expressly incorporated herein by reference.

TECHNICAL FIELD

Embodiments of the present disclosure relate to the field of communication technologies, and in particular, to a transmission method and a device.

BACKGROUND

In the New Radio (NR), two Sounding Reference Signal (SRS) used for measurement and positioning are defined. Currently, only a scheduling rule of the SRS used for measurement and a terminal behavior that occurs when the SRS used for measurement conflicts with resources of a Physical Uplink Shared Channel (PUSCH) and a Physical Uplink Control Channel (PUCCH) are determined.

However, when the SRS used for positioning conflicts with the resources of the PUSCH and the PUCCH, there is no solution for channel/signal transmission.

SUMMARY

Embodiments of the present disclosure are intended to provide a transmission method and a device.

According to a first aspect, an embodiment of the present disclosure provides a transmission method, applied to a terminal and including:
  in a case that resources of at least two of channels or signals at least two of channels or signals conflict, transmitting a channel/signal with a high priority, and/or discarding a channel/signal with a low priority based on a priority relationship between the at least two of channels or signals, where
  at least one of the at least two of channels or signals is: a first SRS, where the first SRS is an SRS used for positioning.

According to a second aspect, an embodiment of the present disclosure provides a transmission method, applied to a network device and including:
  sending first information, where the first information indicates an SRS priority, and the SRS priority includes a first priority and a second priority.

According to a third aspect, an embodiment of the present disclosure provides a network device, including:
  a sending module, configured to send first information, where the first information indicates an SRS priority, and the SRS priority includes a first priority and a second priority.

According to a fourth aspect, an embodiment of the present disclosure provides a communication device, including: a processor, a memory, and a computer program stored in the memory and executable on the processor, where when the computer program is executed by the processor, steps of the transmission method provided in the first aspect or the second aspect are implemented.

According to a fifth aspect, an embodiment of the present disclosure provides a computer-readable storage medium, where the computer-readable storage medium stores a computer program, and when the computer program is executed by a processor, steps of the transmission method provided in the first aspect or the second aspect are implemented.

In the embodiments of the present disclosure, when the SRS used for positioning conflicts with the resources of other channels/signals, based on a priority relationship between the SRS used for positioning and other channels/signals, a channel/signal with a high priority may be transmitted, and/or a channel/signal with a low priority may be discarded, so as to ensure transmission of the channel/signal with the high priority, thereby improving system reliability.

BRIEF DESCRIPTION OF DRAWINGS

With reference to detailed descriptions in preferable implementations in the following descriptions, various other advantages and benefits become clear to a person of ordinary skills in the art. The accompanying drawings are merely used to show exemplary embodiments, and are not considered as limitations to the present disclosure. In addition, in all the accompanying drawings, a same reference symbol is used to represent a same part. In the accompanying drawings.

DETAILED DESCRIPTION

Figure 1:
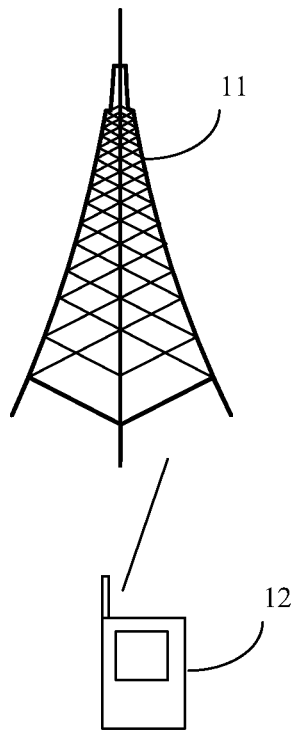
FIG. 1 is a schematic architectural diagram of a wireless communications system according to an embodiment of the present disclosure.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the description and the claims means at least one of the connected objects. For example, A and/or B represents the following three cases: Only A exists, only B exists, and both A and B exist.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

The technology described in this specification is not limited to a Long Term Evolution (LTE)/LTE-advanced (LTE-A) system, and may also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems.

The terms "system" and "network" are often exchanged in use. A CDMA system may implement radio technologies such as CDMA2000, Universal Terrestrial Radio Access (UTRA) and the like. UTRA includes wideband CDMA (Wideband Code Division Multiple Access (WCDMA)) and other CDMA variants. A TDMA system may implement radio technologies such as a global system for mobile communication (Global System for Mobile communication (GSM)) and the like. An OFDMA system may implement radio technologies such as Ultra Mobile Broadband (UMB), Evolved-UTRA (E-UTRA), IEEE 802.11 (Wi-Fi), IEEE 802.16 (WiMAX), IEEE 802.20, Flash-OFDM, and the like. UTRA and the E-UTRA are parts of a Universal Mobile Telecommunications System (UMTS). LTE and more advanced LTE (such as LTE-A) are new UMTS versions that use E-UTRA. The UTRA, E-UTRA, UMTS, LTE, LTE-A and GSM are described in documents from an organization named "3rd Generation Partnership Project (3GPP)". CDMA2000 and UMB are described in a document from an origination named "3rd Generation Partnership Project 2 (3GPP2)". The technologies described in the present disclosure may also be used in the foregoing systems and radio technologies, and may also be used in another system and radio technology.

Referring to FIG. 1, embodiments of the present disclosure will be described below with reference to the accompanying drawings. A transmission method and a device according to the embodiments of the present disclosure may be applied to a wireless communications system. Referring to FIG. 1, it is a schematic architectural diagram of a wireless communications system according to an embodiment of the present disclosure. As shown in FIG. 1, the wireless communications system may include: a network device 11 and a terminal 12. The terminal 12 may be denoted as a UE12, and the terminal 12 may communicate with the network device 11 (to transmit signaling or transmit data). In actual application, a connection between the foregoing devices may be a wireless connection. To represent a connection relationship conveniently and intuitively between the devices, a solid line is used for illustration in FIG. 1.

The network device 11 according to this embodiment of the present disclosure may be a base station, and the base station may be a commonly used base station, an evolved Node Base station (eNB), or a network device (for example, a next generation node base station (gNB)) or a Transmission and Reception Point (TRP) in a 5G system.

The terminal 12 according to this embodiment of the present disclosure may be a mobile phone, a tablet computer, a notebook computer, an Ultra-Mobile Personal Computer (UMPC), a netbook, a Personal Digital Assistant (PDA), a Mobile Internet Device (MID), a wearable device, a vehicle-mounted device, or the like.

Figure 2:
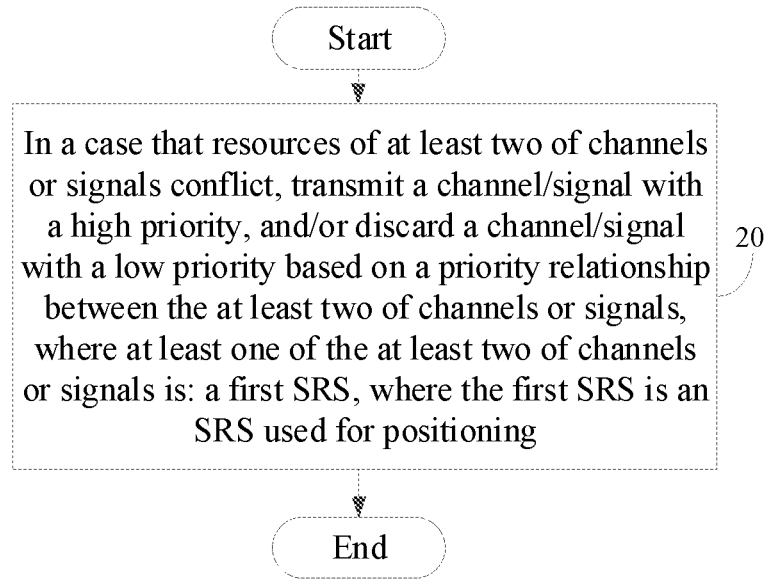
FIG. 2 is a flowchart 1 of a transmission method according to an embodiment of the present disclosure.

Referring to FIG. 2, an embodiment of the present disclosure further provides a transmission method. The method may be performed by a terminal and includes step 201.

Step 201: in a case that resources of at least two of channels or signals at least two of channels or signals conflict, transmitting a channel/signal with a high priority, and/or discarding a channel/signal with a low priority based on a priority relationship between the at least two of channels or signals, where at least one of the at least two of channels or signals is: a first Sounding Reference Signal (SRS), where the first SRS is an SRS used for positioning.

It may be understood that the SRS in this embodiment of the present disclosure includes a first SRS used for positioning and a second SRS used for measurement.

The resource collision of the at least two of channels or signals indicates that the resources of the at least two of channels or signals partially overlap, or the resources of the at least two of channels or signals at least two of channels or signals conflict.

The priority relationship between the at least two of channels or signals is used to indicate a priority difference of channels/signals.

For example, if the at least two of channels or signals include a first channel/signal and a second channel/signal, the priority relationship between the at least two of channels or signals includes: a priority of the first channel/signal is higher than a priority of the second channel/signal; and if the at least two of channels or signals include: a first channel/signal, a second channel/signal, and a third channel/signal, the priority relationship between the at least two of channels or signals includes: a priority of the first channel/signal is higher than a priority of the second channel/signal, and the priority of the second channel/signal is higher than a priority of the third channel/signal, that is, the priority of the first channel/signal>the priority of the second channel/signal>the priority of the third channel/signal.

The priority relationship between the at least two of channels or signals may be stipulated in a protocol or configured on the network side, which is not limited thereto. It may be understood that, if it is stipulated in the protocol that priorities of the at least two of channels or signals are the same, a priority ordering of the at least two of channels or signals may be further determined based on an indication of the network side.

For example, if the at least two of channels or signals include: a first channel/signal and a second channel/signal, where a priority of the first channel/signal is higher than a priority of the second channel/signal, the first channel/signal is transmitted, and/or the second channel/signal is discarded.

For another example, if the at least two of channels or signals include: a first channel/signal, a second channel/signal, and a third channel/signal, where a priority of the first channel/signal is higher than a priority of the second channel/signal, and the priority of the second channel/signal is higher than a priority of the third channel/signal, the first channel/signal is transmitted, and/or the second channel/signal and the third channel/signal are discarded.

For example,
the channel/signal type and the current priority are in descending order:
(a) an Ultra Reliable Low Latency Communications (URLLC) PUCCH;
(b) an URLLC PUSCH;

(c) a PUCCH carrying a Hybrid Automatic Repeat reQuest ACKnowledge (HARQ-ACK) and/or an uplink Scheduling Request (SR);
(d) an aperiodic SRS;
(e) a PUCCH carrying a semi-persistent/periodic CSI report(s) or a semi-persistent/periodic L1-RSRP report(s) only;
(f) a semi-static SRS; and
(g) a periodic SRS.

In some implementations, the method shown in FIG. 2 further includes:
receiving first information, where the first information indicates an SRS priority, and the SRS priority includes a first priority and a second priority.

In some embodiments, further, a priority relationship between the at least two of channels or signals is determined based on the first information.

In some embodiments, the SRS is in a high priority, for example, the SRS may be an SRS used for positioning, an aperiodic SRS, a semi-static SRS, an aperiodic SRS, and the like.

In some embodiments, the first priority is higher than one or more of the following: the second priority; a priority of a demodulation reference signal, such as a demodulation reference signal with a low priority; a priority of a PUSCH, such as a PUSCH with a low priority; and a priority of a PUCCH, such as a PUCCH with a low priority.

For example: (1) the first information may be configuration information, and in some embodiments, the configuration information is configured through Radio Resource Control (RRC), for example, configuration information of the SRS, that is, the configuration information of the SRS is configured with a priority of aperiodic, periodic, and/or semi-static SRS, and the priority relationship between the SRS and other channels/signals may be determined based on the configuration information.

(2) The first information may be Downlink Control Information (DCI), that is, if the DCI indicates the priority of the aperiodic, periodic, and/or semi-static SRS, the priority relationship between the first SRS used for positioning and other channels/signals may be determined based on the DCI.

(3) The first information is a Medium Access Control Control Element (MAC CE), and if the MAC CE indicates the priority of the aperiodic, periodic and/or semi-static SRS, the priority relationship between the first SRS used for positioning and other channels/signals may be determined based on the MAC CE.

In addition, if the first information is configured in a plurality of methods described above, the priority configured in the method (2) may replace the configuration information in the method (1) and the method (3), and the configuration information in the method (3) may replace the configuration information in the method (1).

It may be understood that the priority relationship between the SRS and other channels/signals may be agreed through the protocol. If the first information is not received, the priority relationship between the SRS and other channels/signals is determined according to the agreement; if the first information is received, the priority relationship between the first SRS used for positioning and other channels/signals is determined based on the first information, that is, the priority relationship between the first SRS used for positioning and other channels/signals agreed in the protocol may be changed based on the priority relationship between the first SRS used for positioning and other channels/signals indicated in the received first information.

It may also be understood that the priority of the first SRS may be agreed through the protocol, and if the first information is not received, it is determined based on the protocol that the first SRS used for positioning is a low-priority signal or a non-URLLC service, and the priority relationship between the first SRS used for positioning and other channels/signals is further determined based on priorities of other channels/signals.

If the first information is received, the priority of the first SRS is determined based on the first information. If the first SRS used for positioning is a high-priority signal or a URLLC service, the priority relationship between the first SRS used for positioning and other channels/signals is further determined based on priorities of other channels/signals. For example, the first SRS used for positioning is a high-priority signal or a URLLC service, and other channels/signals are ordinary enhance Mobile BroadBand (eMBB) services or non-priority configuration or low priority channels/signals, and the priority of the first SRS is higher than priorities of other channels/signals.

In other words, the priority relationship between the first SRS used for positioning and other channels/signals agreed in the protocol may be changed based on the priority of the first SRS indicated in the received first information.

It may be understood that when the SRS is not configured with a priority, the priority of the SRS may be determined according to other pre-agreed methods, and if the SRS is configured with a high priority, the priority of the SRS is higher than priorities of other channels/signals. For example:

(1) the priority of the SRS is lower than a priority of a PUSCH carrying a Hybrid Automatic Repeat reQuest (HARQ) or an uplink Scheduling Request (SR), and the priority of the SRS is set to the high priority through the DCI, the MAC, or the RRC. For example, if priority indication information is 1, indicating that the priority of the SRS is the high priority, the priority of the SRS is higher than the priority of the PUSCH carrying the HARQ or the SR;

(2) the priority of the first SRS is lower than a priority of the PUSCH, and the priority of the first SRS is set to the high priority through the DCI, the MAC, or the RRC. For example, if priority indication information is 1, indicating that the priority of the first SRS is the high priority, the priority of the first SRS is higher than the priority of the PUSCH; and (3) the priority of the second aperiodic SRS<the priority of the semi-static SRS<the priority of the periodic SRS, and the priority of any one of the second aperiodic SRS, the semi-static SRS, and the periodic SRS may be set to the high priority through the DCI, the MAC, or the RRC. For example, if the priority indication information is 1, indicating that the priority of the semi-static SRS is the high priority, the priority of the semi-static SRS is higher than priorities of other two SRSs.

In some implementations, a priority of the first SRS is the same as a priority of the second SRS, a priority of a second aperiodic SRS is higher than a priority of the scheduled PUSCH, the at least two of channels or signals include: a first channel/signal and a second channel/signal, and a priority of the first channel/signal is higher than a priority of the second channel/signal, that is, the priority of the first channel/signal>the priority of the second channel/signal.

The first channel/signal and the second channel/signal may be any one or a combination of the following:

(1) the first signal is a first SRS, the second channel is a PUSCH, and the PUSCH may include a scheduled PUSCH and a scheduling-free PUSCH;
namely, the priority of the first SRS is higher than the priority of the PUSCH;
(2) the first signal is a first aperiodic SRS, and the second channel is a PUCCH, for example, a PUCCH carrying a semi-persistent/periodic CSI report(s) or a semi-persistent/periodic L1-RSRP report(s) only;
namely, the priority of the first aperiodic SRS is higher than a PUCCH carrying a semi-persistent/periodic CSI report(s) or a semi-persistent/periodic L1-RSRP report(s) only;
(3) the first signal is a first aperiodic SRS, and the second signal is a second periodic or semi-static SRS;
namely, a priority of the first aperiodic SRS is higher than a priority of the second periodic or semi-static SRS;
(4) the first signal is a first aperiodic SRS, and the second channel is a scheduled PUSCH;
namely, the priority of the first aperiodic SRS is higher than a priority of the scheduled PUSCH.
It may be understood that there are two cases for the scheduled PUSCH:
(a) only including: a dynamically scheduled PUSCH; or
(b) including: a dynamic scheduled PUSCH, a semi-static scheduled PUSCH, and a PUSCH with a configure grant.
(5) the first channel is a PUCCH, and the second signal is a first aperiodic SRS;
namely, the priority of the PUCCH is higher than the priority of the first aperiodic SRS;
(6) the first channel is a PUCCH, and the second signal is an SRS;
namely, a priority of the PUCCH is higher than a priority of the SRS; and
(7) the first signal is a first aperiodic SRS, and the second signal is a first periodic or semi-static SRS;
namely, a priority of the first aperiodic SRS is higher than a priority of the first periodic or semi-static SRS.

In some implementations, a priority of the first SRS is the same as a priority of the second SRS, and/or a priority of a second aperiodic SRS is lower than a priority of the scheduled PUSCH, the at least two of channels or signals include: a first channel/signal and a second channel/signal, and a priority of the first channel/signal is lower than a priority of the second channel/signal, that is, the priority of the first channel/signal<the priority of the second channel/signal.

The first channel/signal and the second channel/signal may be any one or a combination of the following:
(1) the first signal is a first SRS, the second channel is a PUSCH, and for example, the PUSCH may be a scheduled PUSCH or a scheduling-free PUSCH;
namely, a priority of the first SRS is lower than a priority of the scheduled PUSCH, and namely, a priority of the first SRS is lower than a priority of the PUSCH;
(2) the first channel is a PUCCH, for example, a PUCCH carrying a semi-persistent/periodic CSI report(s) or a semi-persistent/periodic L1-RSRP report(s) only, and the second signal is a first aperiodic SRS;
namely, the priority of the PUCCH carrying a semi-persistent/periodic CSI report(s) or a semi-persistent/periodic L1-RSRP report(s) only is lower than a priority of a second aperiodic SRS used for positioning;
(3) the first signal is a second periodic or semi-static SRS, and the second signal is a first aperiodic SRS;
namely, a priority of the second periodic or semi-static SRS is lower than a priority of the first aperiodic SRS;
(4) the first signal is a first aperiodic SRS, and the second channel is a scheduled PUSCH;
namely, the priority of the first aperiodic SRS is lower than a priority of the scheduled PUSCH;
(5) the first channel is a PUCCH, and the second signal is a first aperiodic SRS;
namely, the priority of the PUCCH is lower than the priority of the first aperiodic SRS; and
(6) the first channel is a PUCCH, and the second signal is an SRS;
namely, a priority of the PUCCH is lower than a priority of the SRS.

In some implementations, the at least two of channels or signals include: a first channel/signal, a second channel/signal, and a third channel/signal, a priority of the first channel/signal is higher than a priority of the second channel/signal, and the priority of the second channel/signal is higher than a priority of the third channel/signal, that is, the priority of the first channel/signal>the priority of the second channel/signal>the priority of the third channel/signal.

The first channel/signal, the second channel/signal, and the third channel/signal may be any one or a combination of the following:
(1) the first signal is a second SRS, the second signal is a first SRS, and the third channel is a scheduled PUSCH;
namely, the priority of the second SRS>the priority of the first SRS>the priority of the scheduled PUSCH;
(2) the first signal is a second aperiodic SRS, the second signal is a first aperiodic SRS, and the third channel is a scheduled PUSCH;
namely, a priority of a second aperiodic SRS>a priority of a first aperiodic SRS>the priority of the scheduled PUSCH;
(3) the first signal is a second SRS, the second signal is a first SRS, and the third channel is a PUCCH;
namely, the priority of the second SRS>the priority of the first SRS>a priority of a PUCCH, where the PUCCH may carry a semi-persistent/periodic CSI report(s) or a semi-persistent/periodic L1-RSRP report(s) only, which is certainly not limited thereto; and
(4) the first signal is a second SRS, the second signal is a first aperiodic SRS, and the third channel is a PUCCH;
namely, a priority of a second aperiodic SRS>a priority of a first aperiodic SRS>the priority of the PUCCH.

In some embodiments, the priority of the first SRS is higher than the priority of the scheduled PUSCH; or the priority of the first SRS is higher than the priority of the PUSCH; or the priority of the first aperiodic SRS is higher or lower than a priority of a PUCCH carrying a semi-persistent/periodic CSI report(s) or a semi-persistent/periodic L1-RSRP report(s) only.

In some implementations, the at least two of channels or signals include: a first channel/signal, a second channel/signal, and a third channel/signal, a priority of the first channel/signal is higher than a priority of the second channel/signal, and the priority of the second channel/signal is higher than a priority of the third channel/signal, that is, the priority of the first channel/signal>the priority of the second channel/signal>the priority of the third channel/signal, where
the first signal is a second SRS, the second channel is a scheduled PUSCH, and the third signal is a first SRS, that is, a priority of the second SRS>a priority of the scheduled PUSCH>a priority of the first SRS.

In some embodiments, the priority of the first SRS is lower than the priority of the PUSCH; or the priority of the first aperiodic SRS is lower than the priority of the second aperiodic SRS; or the priority of the first periodic or semi-static SRS is lower than the priority of the second periodic or semi-static SRS; or the priority of the first aperiodic SRS is lower than the priority of the PUCCH carrying a semi-persistent/periodic CSI report(s) or a semi-persistent/periodic L1-RSRP report(s) only; or the priority of the first aperiodic SRS is lower than the priority of the second aperiodic SRS; or the priority of the first aperiodic SRS is higher than the priority of the scheduled PUSCH.

In some implementations, the priority of the first aperiodic SRS is higher than a priority of the scheduled PUSCH.

In the implementation of the first channel/signal, the second channel/signal, and the third channel/signal, the priority of the first SRS is lower than the priority of the second SRS, and the priority of the second aperiodic SRS is higher than the priority of the scheduled PUSCH.

In some implementations, the priority of the first SRS is lower than the priority of the second SRS, and/or the priority of the second aperiodic SRS is lower than the priority of the scheduled PUSCH, the at least two of channels or signals include: a first channel/signal and a second channel/signal, and a priority of the first channel/signal is lower than a priority of the second channel/signal.

The first channel/signal and the second channel/signal may be any one or a combination of the following:
  (1) the first signal is a first SRS, the second channel is a PUSCH, and for example, the PUSCH is a scheduled PUSCH or a scheduling-free PUSCH;
  namely, the priority of the first SRS is lower than the priority of the PUSCH;
  (2) the first signal is a first aperiodic SRS, and the second channel is a PUCCH, for example, a PUCCH carrying a semi-persistent/periodic CSI report(s) or a semi-persistent/periodic L1-RSRP report(s) only;
  namely, the priority of the first aperiodic SRS is lower than a PUCCH carrying a semi-persistent/periodic CSI report(s) or a semi-persistent/periodic L1-RSRP report(s) only;
  (3) the first channel is a PUCCH, for example, a PUCCH carrying a semi-persistent/periodic CSI report(s) or a semi-persistent/periodic L1-RSRP report(s) only, and the second signal is a first aperiodic SRS;
  namely, the priority of the PUCCH carrying a semi-persistent/periodic CSI report(s) or a semi-persistent/periodic L1-RSRP report(s) only is lower than the priority of the first aperiodic SRS;
  (4) the first signal is a second periodic or semi-static SRS, and the second signal is a first aperiodic SRS;
  namely, a priority of the second periodic or semi-static SRS is lower than a priority of the first aperiodic SRS; and
  (5) the first signal is a first aperiodic SRS, and the second channel is a scheduled PUSCH;
  namely, the priority of the first aperiodic SRS is lower than a priority of the scheduled PUSCH.

In some implementations, the priority of the first SRS is higher than the priority of the second SRS, and/or a priority of a second aperiodic SRS is higher than a priority of the scheduled PUSCH, the at least two of channels or signals include: a first channel/signal, a second channel/signal, and a third channel/signal, a priority of the first channel/signal is higher than a priority of the second channel/signal, and the priority of the second channel/signal is higher than a priority of the third channel/signal, that is, the priority of the first channel/signal>the priority of the second channel/signal>the priority of the third channel/signal.

The first channel/signal, the second channel/signal, and the third channel/signal may be any one or a combination of the following:
  (1) the first signal is a first SRS, the second signal is a second SRS, and the third channel is a scheduled PUSCH;
  namely, the priority of the first SRS>the priority of the second SRS>the priority of the scheduled PUSCH;
  (2) the first signal is a first aperiodic SRS, the second signal is a second aperiodic SRS, and the third channel is a scheduled PUSCH;
  namely, a priority of a first aperiodic SRS>a priority of a second aperiodic SRS>the priority of the scheduled PUSCH; and
  (3) the first signal is a first aperiodic SRS, the second channel is a scheduled PUSCH, and the third signal is a second aperiodic SRS;
  namely, a priority of a second aperiodic SRS used for positioning>the priority of the scheduled PUSCH>a priority of a second aperiodic SRS.

In some embodiments, the terminal may send second information to a network side, where the second information indicates that resources of at least two of channels or signals at least two of channels or signals conflict, and the second information may include: a collision event and/or a collision timing. That is, the terminal may report the collision event and a timing at which the resources of at least two of channels or signals at least two of channels or signals conflict to the network side.

In the embodiments of the present disclosure, when the SRS used for positioning conflicts with the resources of other channels/signals, based on a priority relationship between the SRS used for positioning and other channels/signals, a channel/signal with a high priority may be transmitted, and/or a channel/signal with a low priority may be discarded, so as to ensure transmission of the channel/signal with the high priority.

Figure 3:
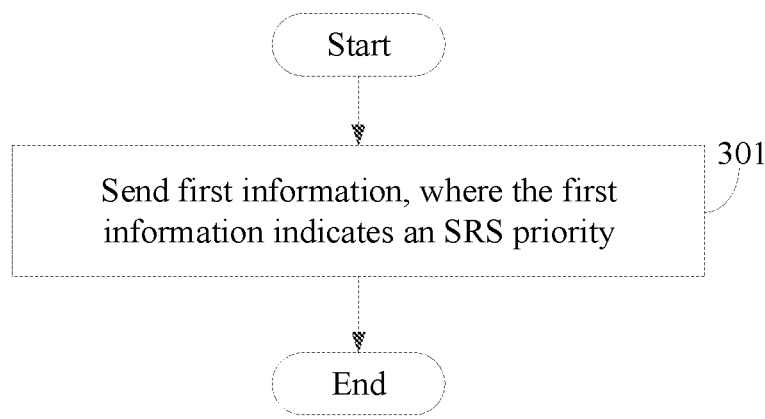
FIG. 3 is a flowchart 2 of a transmission method according to an embodiment of the present disclosure.

Referring to FIG. 3, an embodiment of the present disclosure further provides a transmission method, applied to a network device and including step 301.

Step 301: Send first information, where the first information indicates an SRS priority, and the SRS priority includes a first priority and a second priority.

In some embodiments, the first priority is higher than one or more of the following: the second priority; a priority of a demodulation reference signal; a priority of a PUSCH; and a priority of a PUCCH.

In some embodiments, the method further includes: receiving second information, where the second information indicates that resources of at least two of channels or signals at least two of channels or signals conflict, at least one of the at least two of channels or signals is: an SRS, and the SRS includes a first SRS used for positioning and a second SRS used for measurement.

In some embodiments, the method further includes: sending third information, where the third information instructs the terminal to discard a low-priority channel/signal.

It may be understood that the first information and the third information may be the same or different.

In this embodiment of the present disclosure, the priority of the SRS is indicated by the network side, so that when the SRS conflicts with resources of other channels/signals, based on a priority relationship between the SRS and other channels/signals, a channel/signal with a high priority may be transmitted, and/or a channel/signal with a low priority may be discarded, so as to ensure transmission of the channel/signal with the high priority.

Figure 4:
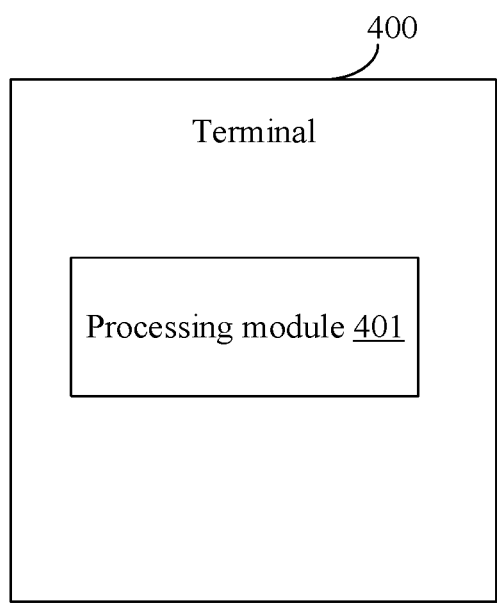
FIG. 4 is a schematic diagram of a terminal according to an embodiment of the present disclosure.

Referring to FIG. 4, an embodiment of the present disclosure provides a terminal, and the terminal 400 includes:
- a processing module 401, configured to: in a case that resources of at least two of channels or signals at least two of channels or signals conflict, transmit a channel/signal with a high priority, and/or discard a channel/signal with a low priority based on a priority relationship between the at least two of channels or signals, where
- at least one of the at least two of channels or signals is: a first SRS used for positioning.

In some implementations, the terminal 400 further includes:
- a receiving module, configured to receive first information, where the first information indicates an SRS priority, and the SRS priority includes a first priority and a second priority.

Further, the terminal 400 further includes:
- a determining module, configured to: determine a priority relationship between the at least two of channels or signals based on the first information.

In some embodiments, the first priority is higher than one or more of the following: the second priority; a priority of a demodulation reference signal, such as a demodulation reference signal with a low priority; a priority of a PUSCH, such as a PUSCH with a low priority; and a priority of a PUCCH, such as a PUCCH with a low priority.

In some embodiments, the first information includes one or more of the following:
(1) configuration information of the SRS;
(2) downlink control information; and
(3) a Media Access Control control element.

In some implementations, the at least two of channels or signals include: a first channel/signal and a second channel/signal, and a priority of the first channel/signal is higher than a priority of the second channel/signal; and
the first channel/signal and the second channel/signal include one or a combination of the following:
(1) the first signal is the first SRS, and the second channel is a PUSCH;
(2) the first signal is a first aperiodic SRS, the second channel is a PUCCH, for example, a PUCCH carrying a semi-persistent/periodic CSI report(s) or a semi-persistent/periodic L1-RSRP report(s) only;
(3) the first signal is a first aperiodic SRS, and the second signal is a second periodic or semi-static SRS; and
(4) the first signal is a first aperiodic SRS, and the second channel is a scheduled PUSCH.

In some implementations, a priority of the first SRS is the same as a priority of the second SRS, and/or a priority of a second aperiodic SRS is higher than a priority of the scheduled PUSCH.

In some implementations, the at least two of channels or signals include: a first channel/signal and a second channel/signal, and a priority of the first channel/signal is lower than a priority of the second channel/signal; and
the first channel/signal and the second channel/signal include one or a combination of the following:
(1) the first signal is the first SRS, and the second channel is a PUSCH;
(2) the first channel is a PUCCH, for example, a PUCCH carrying a semi-persistent/periodic CSI report(s) or a semi-persistent/periodic L1-RSRP report(s) only, and the second signal is a first aperiodic SRS;
(3) the first signal is a second periodic or semi-static SRS, and the second signal is a second aperiodic SRS; and
(4) the first signal is a first aperiodic SRS, and the second channel is a scheduled PUSCH.

In some implementations, a priority of the first SRS is the same as a priority of the second SRS, and/or a priority of a second aperiodic SRS is lower than a priority of the scheduled PUSCH.

In some implementations, the at least two of channels or signals include: a first channel/signal, a second channel/signal, and a third channel/signal, a priority of the first channel/signal is higher than a priority of the second channel/signal, and the priority of the second channel/signal is higher than a priority of the third channel/signal, where
the first channel/signal, the second channel/signal, and the third channel/signal include one or a combination of the following:
(1) the first signal is a second SRS, the second signal is a first SRS, and the third channel is a scheduled PUSCH; and
(2) the first signal is a second aperiodic SRS, the second signal is a first aperiodic SRS, and the third channel is a scheduled PUSCH.

In some implementations, the priority of the first SRS is higher than the priority of the scheduled PUSCH; or the priority of the first SRS is higher than the priority of the PUSCH; or the priority of the first aperiodic SRS is higher or lower than a priority of a PUCCH carrying a semi-persistent/periodic CSI report(s) or a semi-persistent/periodic L1-RSRP report(s) only.

In some implementations, the at least two of channels or signals include: a first channel/signal, a second channel/signal, and a third channel/signal, a priority of the first channel/signal is higher than a priority of the second channel/signal, and the priority of the second channel/signal is higher than a priority of the third channel/signal, where the first signal is a second SRS, the second channel is a scheduled PUSCH, and the third signal is a first SRS.

In some implementations, the priority of the first SRS is lower than the priority of the PUSCH; or the priority of the first aperiodic SRS is lower than the priority of the second aperiodic SRS; or the priority of the first periodic or semi-static SRS is lower than the priority of the second periodic or semi-static SRS; or the priority of the first aperiodic SRS is lower than the priority of the PUCCH, for example, a PUCCH carrying a semi-persistent/periodic CSI report(s) or a semi-persistent/periodic L1-RSRP report(s) only; or the priority of the first aperiodic SRS is lower than the priority of the second aperiodic SRS; or the priority of the first aperiodic SRS is higher than the priority of the scheduled PUSCH.

In some implementations, a priority of the first SRS is lower a priority of the second SRS, and/or a priority of a second aperiodic SRS is higher than a priority of the scheduled PUSCH.

In some implementations, the at least two of channels or signals include: a first channel/signal and a second channel/signal, and a priority of the first channel/signal is lower than a priority of the second channel/signal; and
the first channel/signal and the second channel/signal include one or a combination of the following:
(1) the first signal is a first SRS, and the second channel is a scheduled PUSCH;
(2) the first signal is the first SRS, and the second channel is a PUSCH;
(3) the first signal is a first aperiodic SRS, the second channel is a PUCCH, for example, a PUCCH carrying a semi-persistent/periodic CSI report(s) or a semi-persistent/periodic L1-RSRP report(s) only;

(4) the first channel is a PUCCH, for example, a PUCCH carrying a semi-persistent/periodic CSI report(s) or a semi-persistent/periodic L1-RSRP report(s) only, and the second signal is a first aperiodic SRS;

(5) the first signal is a second periodic or semi-static SRS, and the second signal is a first aperiodic SRS; and (6) the first signal is a first aperiodic SRS, and the second channel is a scheduled PUSCH.

In some implementations, a priority of the first SRS is lower than a priority of the second SRS, and a priority of the second aperiodic SRS is lower than a priority of the scheduled PUSCH.

In some implementations, the at least two of channels or signals include: a first channel/signal, a second channel/signal, and a third channel/signal, a priority of the first channel/signal is higher than a priority of the second channel/signal, and the priority of the second channel/signal is higher than a priority of the third channel/signal, where the first channel/signal, the second channel/signal, and the third channel/signal include one or a combination of the following:

(1) the first signal is a first SRS, the second signal is a second SRS, and the third channel is a scheduled PUSCH;

(2) the first signal is a first aperiodic SRS, the second signal is a second aperiodic SRS, and the third channel is a scheduled PUSCH; and (3) the first signal is a first aperiodic SRS, the second channel is a scheduled PUSCH, and the third signal is a second aperiodic SRS.

In some embodiments, a priority of the first SRS is higher than a priority of the second SRS, and/or a priority of a first aperiodic SRS is higher than a priority of a second aperiodic SRS.

In some embodiments, the terminal 400 may further include: a reporting module, configured to send second information to a network side, where the second information indicates that resources of at least two of channels or signals at least two of channels or signals conflict. That is, the terminal may report the collision event and a timing at which the resources of at least two of channels or signals at least two of channels or signals conflict to the network side.

The terminal according to this embodiment of the present disclosure may perform the foregoing method embodiment shown in FIG. 2. An implementation principle and a technical effect of the terminal are similar to those of the method embodiment, and details are not described again in this embodiment.

Figure 5:
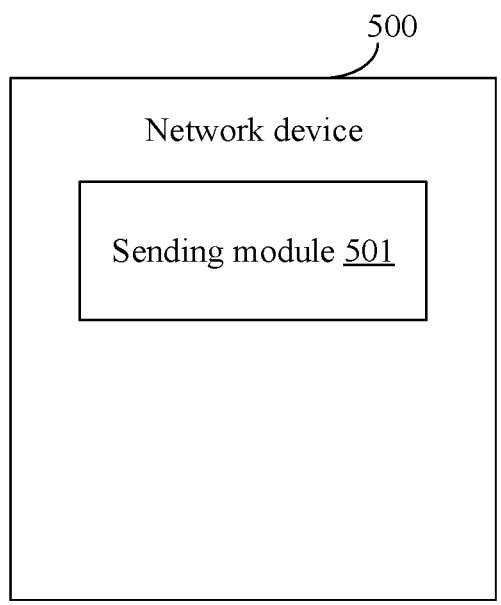
FIG. 5 is a schematic diagram of a network device according to an embodiment of the present disclosure.

Referring to FIG. 5, an embodiment of the present disclosure further provides a network device, and the network device 500 includes:

a sending module 501, configured to send first information, where the first information indicates an SRS priority, and the SRS priority includes a first priority and a second priority.

In some embodiments, the first priority is higher than one or more of the following: the second priority; a priority of a demodulation reference signal; a priority of a PUSCH; and a priority of a PUCCH.

In some embodiments, the network device 500 further includes:

a receiving module, configured to receive second information, where the second information indicates that resources of at least two of channels or signals at least two of channels or signals conflict, at least one of the at least two of channels or signals is: an SRS, and the SRS includes a first SRS used for positioning and/or a second SRS used for measurement.

The terminal according to this embodiment of the present disclosure may perform the foregoing method embodiment shown in FIG. 3. An implementation principle and a technical effect of the terminal are similar to those of the method embodiment, and details are not described again in this embodiment.

Figure 6:
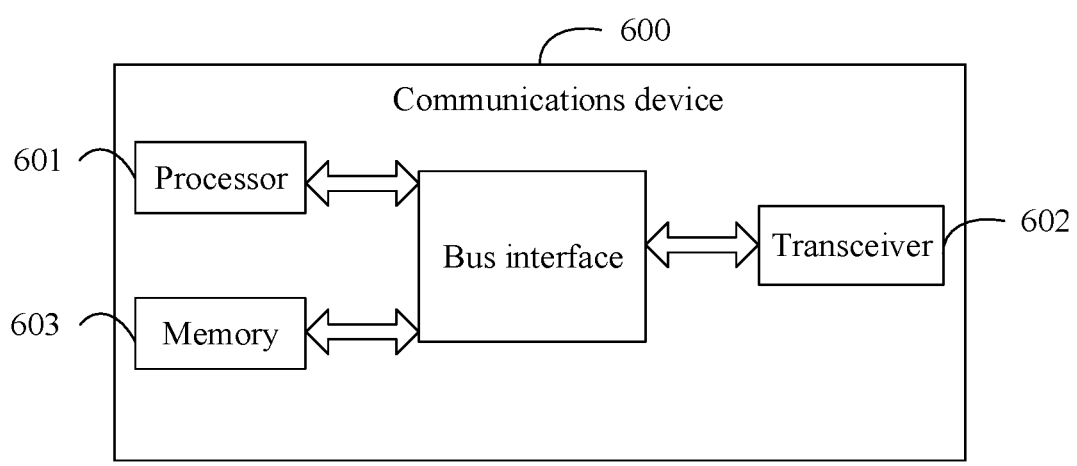
FIG. 6 is a schematic diagram of a communication device according to an embodiment of the present disclosure.

Referring to FIG. 6, FIG. 6 is a structural diagram of a communication device to which an embodiment of the present disclosure is applied. As shown in FIG. 6, the communication device 600 includes: a processor 601, a transceiver 602, a memory 603, and a bus interface.

In an embodiment of the present disclosure, the communication device 600 further includes: a computer program stored in the memory 603 and executable on the processor 601, and when the computer program is executed by the processor 601, steps in the embodiments shown in FIG. 2 or FIG. 3 are implemented.

In FIG. 6, a bus architecture may include any quantity of interconnected buses and bridges, and is linked by various circuits of one or more processors represented by the processor 601 and a memory represented by the memory 603. The bus architecture may further link various other circuits such as a peripheral device, a voltage regulator, and a power management circuit together. These are all well-known in the art, and therefore are not further described in this specification. The bus interface provides interfaces. The transceiver 602 may be a plurality of elements, in other words, includes a transmitter and a receiver, and provides a unit configured to communicate with various other apparatuses on a transmission medium.

The processor 601 is responsible for bus architecture management and general processing. The memory 603 may store data used by the processor 601 when the processor performs an operation.

The communication device provided in this embodiment of the present disclosure may execute the foregoing method embodiment shown in FIG. 2 or FIG. 3, and implementation principles and technical effects thereof are similar, and details are not described herein again in this embodiment.

The method or algorithm steps described in combination with content disclosed in the present disclosure may be implemented by hardware, or may be implemented by a processor by executing software instructions. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. An exemplary storage medium is coupled to the processor, so that the processor can read information from the storage medium and can write information to the storage medium. Certainly, the storage medium may also be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing description of embodiments. It should be understood that the foregoing descriptions are merely description of embodiments of the present disclosure, and are not intended to limit the protection scope of the present disclosure. Any modification, equivalent replacement, improvement, or the like made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may be embodiments in a form of a complete hardware embodiment, a complete software embodiment, or an embodiment incorporating software and hardware aspects. Moreover, the embodiments of the present disclosure may use a form of a computer program product that is implemented on one or more computer-usable storage media (including but not limited to a magnetic disk memory, a CD-ROM, an optical memory, and the like) that include a computer-usable program code.

The embodiments of the present disclosure are described with reference to the flowcharts and/or block diagrams of the methods, devices (systems), and computer program products according to the embodiments of the present disclosure. It should be understood that each process and/or block in the flowchart and/or block diagram as well as a combination of processes and/or blocks in the flowchart and/or block diagram may be implemented by computer program instructions. These computer program instructions can be provided to a general-purpose computer, a special-purpose computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of the another programmable data processing device.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function specified in one or more procedures of the flowchart and/or in one or more blocks of the block diagram.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of the present disclosure without departing from the spirit and scope of the present disclosure. In this way, the present disclosure is intended to include these modifications and variations to the embodiments of the present disclosure provided that these modifications and variations fall within the scope of the claims of the present disclosure and their equivalent technologies.

The invention claimed is:

1. A transmission method, performed by a terminal, wherein the method comprises:
   when resources of at least two of channels or signals conflict, transmitting a channel or a signal with a high priority, or discarding a channel or a signal with a low priority based on a priority relationship between the at least two of channels or signals,
   wherein at least one of the at least two of channels or signals is a first Sounding Reference Signal (SRS), wherein the first SRS is an SRS used for positioning, and
   wherein the transmission method further comprises:
      when first information is received, determining the first SRS used for positioning is a high-priority signal based on the received first information; and
      when the first information is not received, determining the first SRS used for positioning is a low-priority signal as agreed through a protocol,
      wherein the first information is configured through Radio Resource Control (RRC), and a priority of the first SRS is changed based on the first information configured through RRC.

2. The method according to claim 1, further comprising:
   receiving the first information, wherein the first information indicates an SRS priority, and the SRS priority comprises a first priority and a second priority.

3. The method according to claim 2, wherein the first priority is higher than one or more of the following:
   the second priority;
   a priority of a demodulation reference signal;
   a priority of a Physical Uplink Shared CHannel (PUSCH); and
   a priority of a Physical Uplink Control CHannel (PUCCH).

4. The method according to claim 2, wherein the first information comprises one or more of the following:
   configuration information of the SRS;
   downlink control information; and
   a Media Access Control Control Element (MAC CE).

5. The method according to claim 1, wherein the at least two of channels or signals comprise: a first channel or a first signal and a second channel or a second signal, and a priority of the first channel or the first signal is higher than a priority of the second channel or the second signal;
   wherein the first channel or the first signal and the second channel or the second signal comprise one or a combination of the following:
   the first signal is the first SRS, and the second channel is a PUSCH;
   the first signal is a first aperiodic SRS, and the second channel is a PUCCH;
   the first signal is a first aperiodic SRS, the second signal is a second SRS comprising a second periodic or semi-static SRS, and the second SRS is an SRS used for measurement; and
   the first signal is a first aperiodic SRS, and the second channel is a scheduled PUSCH.

6. The method according to claim 5, wherein the priority of the first SRS is the same as a priority of the second SRS, or a priority of a second aperiodic SRS is higher than a priority of the scheduled PUSCH.

7. The method according to claim 1, wherein the at least two of channels or signals comprise: a first channel or a first signal and a second channel or a second signal, and a priority of the first channel or the first signal is lower than a priority of the second channel or the second signal;
   wherein the first channel or the first signal and the second channel or the second signal comprise one or a combination of the following:
   the first signal is the first SRS, and the second channel is a PUSCH;
   the first channel is a PUCCH, and the second signal is a first aperiodic SRS;
   the first signal is a second SRS comprising a second periodic or semi-static SRS, and the second signal is a first aperiodic SRS; and
   the first signal is a first aperiodic SRS, and the second channel is a scheduled PUSCH.

8. The method according to claim 7, wherein
   the priority of the first SRS is the same as a priority of the second SRS, and a priority of the first aperiodic SRS is lower than a priority of the scheduled PUSCH;
   or;
   the priority of the first SRS is lower than a priority of the second SRS, and a priority of a second aperiodic SRS is lower than a priority of the scheduled PUSCH.

9. The method according to claim 1, wherein the at least two of channels or signals comprise: a first channel or a first signal, a second channel or a second signal, and a third channel or a third signal, a priority of the first channel or the first signal is higher than a priority of the second channel or the second signal, and the priority of the second channel or the second signal is higher than a priority of the third channel or the third signal;
   wherein the first channel or the first signal, the second channel or the second signal, and the third channel or the third signal comprise one or a combination of the following:
   the first signal is a second SRS, the second signal is the first SRS, and the third channel is a scheduled PUSCH; and
   the first signal is a second aperiodic SRS, the second signal is a first aperiodic SRS, and the third channel is the scheduled PUSCH.

10. The method according to claim 9, wherein
    the priority of the first SRS is higher than a priority of the scheduled PUSCH;
    the priority of the first SRS is higher than a priority of a PUSCH;
    or
    a priority of the first aperiodic SRS is higher or lower than the priority of a PUCCH.

11. The method according to claim 1, wherein the at least two of channels or signals comprise: a first channel or a first signal, a second channel or a second signal, and a third channel or a third signal, a priority of the first channel or the first signal is higher than a priority of the second channel or the second signal, and the priority of the second channel or the second signal is higher than a priority of the third channel or the third signal, wherein
    the first signal is a second SRS, the second channel is a scheduled PUSCH, and the third signal is the first SRS.

12. The method according to claim 11, wherein
    the priority of the first SRS is lower than a priority of a PUSCH;
    a priority of a first aperiodic SRS is lower than a priority of a second aperiodic SRS;
    a priority of a first periodic or semi-static SRS is lower than a priority of a second periodic or semi-static SRS;
    a priority of the first aperiodic SRS is lower than a priority of a PUCCH;
    or
    the priority of the first aperiodic SRS is higher than a priority of the scheduled PUSCH.

13. The method according to claim 9, wherein
    the priority of the first SRS is lower than a priority of the second SRS, or a priority of the second aperiodic SRS is higher than a priority of the scheduled PUSCH.

14. The method according to claim 1, wherein the at least two of channels or signals comprise: a first channel or a first signal, a second channel or a second signal, and a third channel or a third signal, a priority of the first channel or the first signal is higher than a priority of the second channel or the second signal, and the priority of the second channel or the second signal is higher than a priority of the third channel or the third signal;
    wherein the first channel or the first signal, the second channel or the second signal, and the third channel or the third signal comprise one or a combination of the following:
    the first signal is the first SRS, the second signal is a second SRS, and the third channel is a scheduled PUSCH;
    the first signal is a first aperiodic SRS, the second signal is a second aperiodic SRS, and the third channel is the scheduled PUSCH; and
    the first signal is the first aperiodic SRS, the second channel is the scheduled PUSCH, and the third signal is the second aperiodic SRS.

15. The method according to claim 14, wherein
    the priority of the first SRS is higher than a priority of the second SRS, or a priority of the first aperiodic SRS is higher than a priority of the second aperiodic SRS.

16. The method according to claim 1, further comprising:
    sending second information, wherein the second information indicates that the resources of the at least two of channels or signals conflict.

17. A transmission method, performed by a network side device, wherein the method comprises:
    sending first information, wherein the first information indicates a Sounding Reference Signal (SRS) priority, and the SRS priority comprises a first priority and a second priority; and
    receiving second information, wherein the second information indicates that resources of at least two of channels or signals conflict, at least one of the at least two of channels or signals is an SRS, the SRS comprises a first SRS or a second SRS, the first SRS is an SRS used for positioning, and the second SRS is an SRS used for measurement,
    wherein the first SRS used for positioning is determined to be a high-priority signal based on the first information sent by the network side device, and
    wherein the first information is configured through Radio Resource Control (RRC), and a priority of the first SRS is changed based on the first information configured through RRC.

18. The method according to claim 17, wherein the first priority is higher than one or more of the following:
- the second priority;
- a priority of a demodulation reference signal;
- a priority of a PUSCH; and
- a priority of a PUCCH.

19. A communication device, comprising:
- a memory storing computer-readable instructions; and
- a processor coupled to the memory and configured to execute the computer-readable instructions, wherein the computer-readable instructions, when executed by the processor, cause the processor to perform operations comprising:
  - when resources of at least two of channels or signals conflict, transmitting a channel or a signal with a high priority, or discarding a channel or a signal with a low priority based on a priority relationship between the at least two of channels or signals,
  - wherein at least one of the at least two of channels or signals is a first Sounding Reference Signal (SRS), wherein the first SRS is an SRS used for positioning,
  - wherein the operations further comprise:
    - when first information is received, determining the first SRS used for positioning is a high-priority signal based on the received first information; and
    - when the first information is not received, determining the first SRS used for positioning is a low-priority signal as agreed through a protocol,
  - wherein the first information is configured through Radio Resource Control (RRC), and a priority of the first SRS is changed based on the first information configured through RRC.

20. The communication device according to claim 19, wherein the operations further comprise:
- sending or receiving the first information, wherein the first information indicates an SRS priority, and the SRS priority comprises a first priority and a second priority; and
- receiving second information, wherein the second information indicates that the resources of the at least two of channels or signals conflict, at least one of the at least two of channels or signals is an SRS, the SRS comprises the first SRS or a second SRS, and the second SRS is an SRS used for measurement.

* * * * *